(12) United States Patent

Yamagata et al.

(10) Patent No.: US 10,560,007 B2
(45) Date of Patent: Feb. 11, 2020

(54) MOTOR

(71) Applicant: Mabuchi Motor Co., LTD., Matsudo, Chiba (JP)

(72) Inventors: Yasuhiro Yamagata, Matsudo (JP); Isao Kubota, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 347 days.

(21) Appl. No.: 15/538,628

(22) PCT Filed: Nov. 24, 2015

(86) PCT No.: PCT/JP2015/082896
§ 371 (c)(1),
(2) Date: Jun. 21, 2017

(87) PCT Pub. No.: WO2016/104015
PCT Pub. Date: Jun. 30, 2016

(65) Prior Publication Data

US 2017/0373571 A1    Dec. 28, 2017

(30) Foreign Application Priority Data

Dec. 24, 2014   (JP) ................................ 2014-261025

(51) Int. Cl.
*H02K 15/14* (2006.01)
*H02K 5/14* (2006.01)

(52) U.S. Cl.
CPC ............. *H02K 15/14* (2013.01); *H02K 5/14* (2013.01)

(58) Field of Classification Search
CPC .................. H02K 15/14; H02K 5/14
See application file for complete search history.

(56) References Cited

U.S. PATENT DOCUMENTS

2004/0046480 A1   3/2004   Takahashi
2010/0270879 A1   10/2010  Matsushita

FOREIGN PATENT DOCUMENTS

DE   2037993 A1    5/1971
JP   2004023861 A  1/2004
JP   4179590 B2    11/2008

OTHER PUBLICATIONS

The State Intellectual Property Office of People's Republic of China: The First Office Action in CN App. No. 201580068000.8 dated Sep. 30, 2018; 14 pages, including English translation.
Patent Cooperation Treaty; International Preliminary Report on Patentability for PCT/JP2015/082896 dated Jun. 27, 2017; 12 pages, including English translation.
International Search Report for PCT/JP2015/082896 dated Feb. 16, 2016; 5 pages, including English translation.

*Primary Examiner* — Mohamad A Musleh
(74) *Attorney, Agent, or Firm* — Schwabe Williamson & Wyatt, PC

(57) ABSTRACT

A motor includes: a cylindrical housing that houses a rotor; a first member mounted to an opening of the housing; and a second member sandwiching the first member as mounted between the second member and the housing. The housing includes, at an end of the housing that faces the second member, a first locking part that locks a first locked part of the second member. The second member is elastically deformed by the first locking part and locked to the housing accordingly and is configured such that a gap is formed between the second member and the housing when the second member is locked to the housing.

15 Claims, 11 Drawing Sheets

MOTOR

CROSS-REFERENCE TO RELATED APPLICATION

The present application is a national phase entry under 35 U.S.C. § 371 of International Application No. PCT/JP2015/082896, filed Nov. 24, 2015, entitled "MOTOR," which designates the United States of America, and claims the benefit of priority from the prior Japanese Patent Application No. 2014-261025, filed on Dec. 24, 2014, the entire contents of which are incorporated herein by reference.

BACKGROUND OF THE INVENTION

1. Field of the Invention

The present invention relates to a structure for fixing members.

2. Description of the Related Art

Structures in which a brush holder is fitted to an opening of a cylindrical yoke constituting a motor have been known to date. There is also proposed a structure in which a brush holder is sandwiched by a yoke and a front bracket (see JP4179590).

The degree of expansion and shrinkage of members due to a variation in the temperature and humidity varies depending on the material and shape of the members. For this reason, if a variation in the temperature or moisture absorption is repeated while the members are fitted and fixed to each other, the state of fitting between the members could undergo a gradual change, resulting in loose connections between the members.

SUMMARY OF THE INVENTION

The present invention addresses this background and a purpose thereof is to provide a technology capable of maintaining the members fixed together in a stable manner.

The motor according to an embodiment of the present invention comprises: a cylindrical housing that houses a rotor; a first member mounted to an opening of the housing; and a second member sandwiching the first member as mounted between the second member and the housing. The housing includes, at an end of the housing that faces the second member, a first locking part that locks a first locked part of the second member. The second member is elastically deformed by the first locking part and locked to the housing accordingly and is configured such that a gap is formed between the second member and the housing when the second member is locked to the housing.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
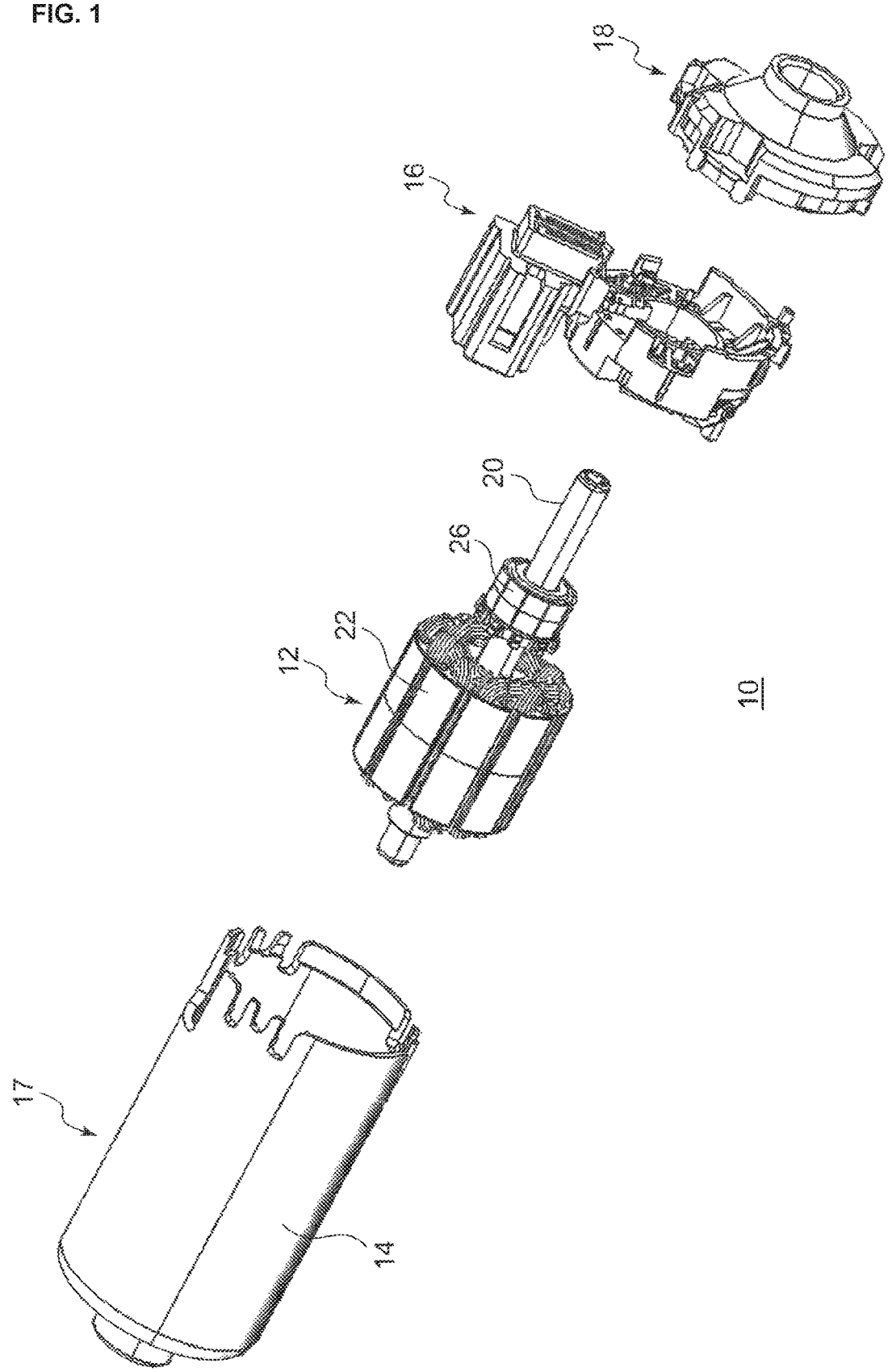
FIG. 1 is an exploded perspective view of the DC motor according to the embodiment.

The motor according to an embodiment of the present invention comprises: a cylindrical housing that houses a rotor; a first member mounted to an opening of the housing; and a second member sandwiching the first member as mounted between the second member and the housing. The housing includes, at an end of the housing that faces the second member, a first locking part that locks a first locked part of the second member. The second member is elastically deformed by the first locking part and locked to the housing accordingly and is configured such that a gap is formed between the second member and the housing when the second member is locked to the housing.

According to this embodiment, the second member is configured such that a gap is formed between the second member and the housing when the second member is locked to the housing. The gap allows the second member to be deflected even when the dimension of the second member is changed due to a change in the temperature or humidity. Accordingly, the first locking part is prevented from being deformed due to the expansion of the second member. As a result, the second member is maintained in a state of being biased by the first locking part toward the housing and fixed accordingly, and the second member and the first member are prevented from becoming loose.

The first locking part may be a first swaging part produced by deforming a part of the housing.

The first member may include a first contact part that comes into contact with an end face of the housing when the first member is sandwiched between the second member and the housing. This allows the first member to be positioned with precision relative to the housing.

The second member may include a second locked part that presses the first contact part toward the end face. The housing may include, at an end of the housing that faces second member, a second locking part that locks the second locked part, and The second locking part may be a second swaging part produced by deforming a part of the housing so that the first contact part and the second locked part are biased toward the housing and are fixed accordingly. This allows the first member and the second member to be positioned together.

The first member may include a main part in which an outer circumferential surface along an inner circumferential surface of the housing is formed, and a pressed part provided to face the second member and configured such that the outer circumferential surface is expanded when the pressed part is pressed. The second member may include a pressing part that presses the pressed part when the first member is sandwiched between the second member and the housing. This allows the outer circumferential surface of the first member to be expanded by the pressed part of the first member pressed by the pressing part of the second member as the first member is sandwiched between the second member and the housing, allowing the first member to be firmly fitted to the inner circumferential surface of the housing.

The pressed part may include a first slope that grows higher in an axial direction away from a center of the first member toward an outer circumferential surface thereof. The pressing part may include a second slope that grows lower in an axial direction away from a center of the second member toward an outer circumferential surface thereof. This realizes a mechanism whereby the outer circumferential surface of the first member is expanded without requiring a complicated shape of the pressed part or the pressing part.

Denoting an angle of the first slope relative to a horizontal plane perpendicular to the axial direction of the housing by $\alpha°$, and denoting an angle of the second slope relative to the horizontal plane perpendicular to the axial direction of the housing by $\beta°$, the angles may be configured such that $\alpha<\beta$ is met. This can expand the outer circumferential surface of the first member with a relative small force.

The first member may further include a connector part that projects from the main part in a radial direction and a joint part that joins the main part and the connector part. The joint part may include a second contact part that comes into contact with the end face of the housing when the joint part is sandwiched between the second member and the housing. The second contact part may be provided opposite to the first contact part across the center of the housing. This causes the first member to come into contact with two remote parts of the end face of the housing so that the precision of positioning is improved and the first member is prevented from being mounted at an angle.

Another embodiment of the present invention also relates to a motor. The motor comprises: a cylindrical housing that houses a rotor; a first member mounted to an opening of the housing; and a second member sandwiching the first member as mounted between the second member and the housing. The first member includes a main part in which an outer circumferential surface along an inner circumferential surface of the housing is formed, and a pressed part provided to face the second member and configured such that the outer circumferential surface is expanded when the pressed part is pressed. The second member includes a pressing part that presses the pressed part when the second member sandwiches the first member between the second member and the housing.

According to this embodiment, the outer circumferential surface of the first member is expanded by the pressed part of the first member pressed by the pressing part of the second member as the first member is sandwiched between the second member and the housing, allowing the first member to be firmly fitted to the inner circumferential surface of the housing.

The first member may be a brush holder in which at least two brushes are supported in the main part.

The housing may include at least two first swaging parts. One of the two brushes may be placed between one of the first swaging parts and the second swaging part. The other of the two brushes may be placed between the other of the first swaging parts and the second swaging part.

The gap may be in a range 0.1-0.7 mm at least in part. If the gap is 0.1 mm or larger, the amount of deflection that allows for a change in the dimension of the second member is properly secured. If the gap is 0.7 mm or smaller, foreign materials are unlikely to enter the gap.

The housing may be formed of a metallic material. The first member and the second member may be formed of a resin material. This can make the swaging parts of the housing rigid. Further, this allows the first member or the second member itself to be deflected without erecting the swaging part, in the event that the first member or the second member is deformed.

Optional combinations of the aforementioned constituting elements, and implementations of the invention in the form of methods, apparatuses, and systems may also be practiced as additional modes of the present invention.

According to the embodiment, the members can remain fixed together in a stable manner.

A description will be given of an embodiment of the present invention with reference to the drawings. Like numerals represent like elements so that the description will be omitted accordingly. The structure described below is by way of example only and does not limit the scope of the invention. A DC motor is described below by way of example.

(DC Motor)

FIG. 1 is an exploded perspective view of the DC motor according to the embodiment. As shown in FIG. 1, the DC motor 10 is provided with a housing 14 that houses components such as a rotor 12 and a permanent magnet (not shown), a brush holder 16 to which a brush 15 (see FIG. 4 described below) and a terminal are mounted, a mounting member 18 fixed to the housing 14 along with the brush holder 16.

The rotor 12 includes a core 22 through which a shaft 20 extends at the center, a coil 24 wound around the core 22, and a commutator 26 for feeding an electric current supplied via the brush 15 to the coil 24 in a timely manner.

(Structure for Fixing)

Figure 2A:
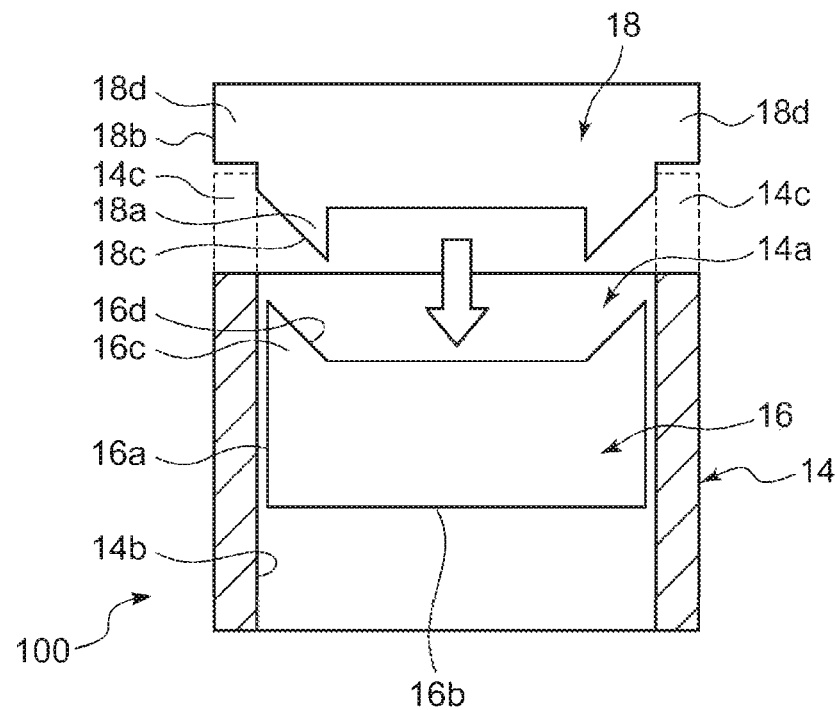
FIG. 2A is a sectional view schematically showing a state occurring before the mounting member according to the embodiment is mounted to the housing.
Figure 2B:
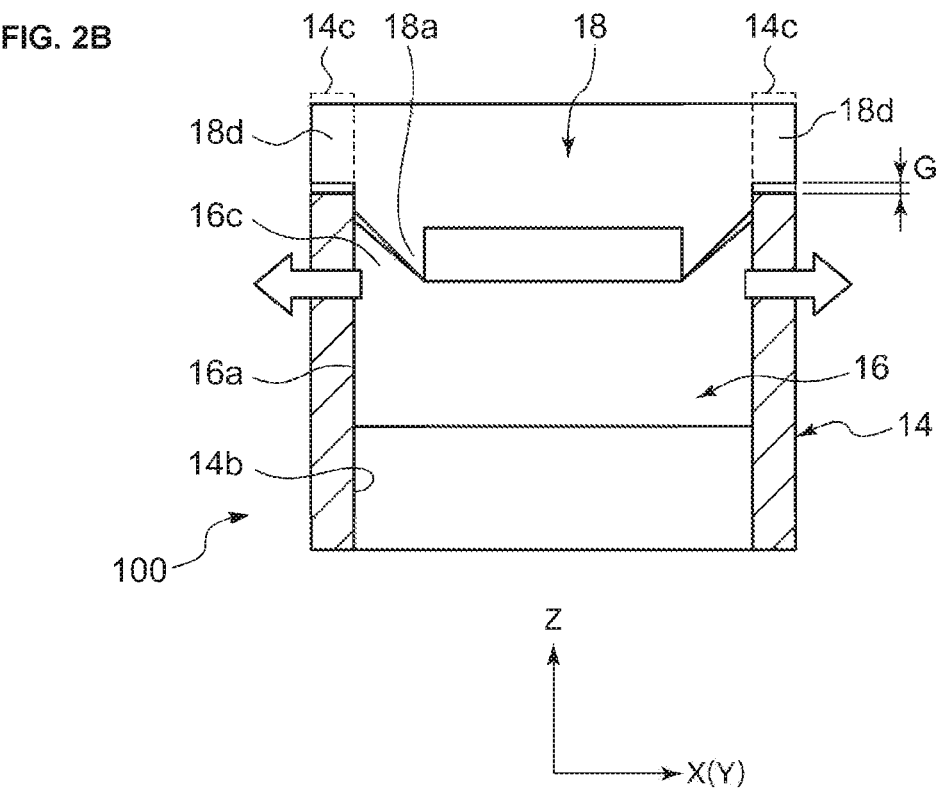
FIG. 2B is a sectional view schematically showing a state occurring after the mounting member is mounted to the housing.

A description will now be given of a schematic structure for fixing members according to the embodiment. FIG. 2A is a sectional view schematically showing a state occurring before the mounting member according to the embodiment is mounted to the housing, and FIG. 2B is a sectional view schematically showing a state occurring after the mounting member is mounted to the housing.

A fixing structure 100 according to the embodiment is provided with a cylindrical housing 14 that houses the rotor 12, a brush holder 16 (first member) mounted to an opening 14a of the housing 14, and a mounting member 18 (second member) sandwiching the brush holder 16 as mounted between the mounting member 18 and the housing 14. A permanent magnet (not shown) is fixed inside the cylindrical housing 14 that houses the rotor 12 so as to form a stator 17 (see FIG. 1).

The brush holder 16 includes a main part 16b in which an outer circumferential surface 16a along an inner circumferential surface 14b of the housing 14 is formed, and a pressed part 16c provided to face the mounting member 18 and configured such that the outer circumferential surface 16a is expanded when the pressed part is pressed. The brush is supported by the main part 16b. The mounting member 18 includes a pressing part 18a that presses the pressed part 16c while the brush holder 16 is sandwiched between the mounting member 18 and the housing 14.

The pressed part 16c includes a first slope 16d that grows higher in the axial direction away from the center of the brush holder 16 toward the outer circumferential surface 16a. The pressing part 18a includes a second slope 18c that grows lower in the axial direction away from the center of the mounting member 18 toward the outer circumferential surface 18b thereof. This realizes a mechanism whereby the outer circumferential surface 16a of the brush holder 16 is expanded without requiring a complicated shape of the pressed part 16c or the pressing part 18a.

As the mounting member 18 is pressed against the brush holder 16 in the state shown in FIG. 2A so as to sandwich the brush holder 16 between the mounting member 18 and the housing 14, the pressed part 16c of the brush holder 16 pressed by the pressing part 18a of the mounting member 18 expands the outer circumferential surface 16a of the brush holder 16, allowing the brush holder 16 to be firmly fitted to the inner circumferential surface 14b of the housing 14.

In the fixing structure 100 according to the embodiment, the housing 14 includes, at the end of the housing that faces the mounting member 18, a first locking part 14c that locks a first locked part 18d of the mounting member 18. The first locking part 14c is a first swaging part produced by deforming a part of the housing 14 so that the mounting member 18 is biased toward the housing 14 and is fixed accordingly. The first swaging part will be described in detail below. The mounting member 18 is elastically deformed by the first locking part 14c and is locked to the housing 14 in that state. The mounting member 18 is also configured to form a gap G between the mounting member 18 and the housing 14 while the mounting member 18 is locked to the housing 14.

In a related-art structure where a plurality of members are fitted together by being brought into intimate contact with each other and are ultimately fixed by swaging, intimate contact between the members can be maintained immediately after swaging. In a case where metallic swage is used to fix a resin member, however, a part of the resin member expanded due to a change in the environment is pressed hard against the swaging part and is deformed accordingly. When the resin member shrinks afterwards due to a change in the temperature, a gap is created between the part of the resin member deformed by the swaging part and the swaging part with the result that the members could become loose.

Meanwhile, in the fixing structure 100 according to the embodiment, the mounting member 18 is configured to form a gap G between the mounting member 18 and the housing 14 while the mounting member 18 is locked to the housing 14. The gap G allows a part of the mounting member 18 to be deflected when the dimension of the mounting member 18 is changed due to a change in the temperature or humidity. Accordingly, the swaging part is prevented from being deformed due to the expansion of the mounting member 18. As a result, the mounting member 18 is maintained in a state of being biased by the swaging part toward the housing 14 and fixed accordingly even if the mounting member 18 is repeatedly expanded and shrinked due to a change in the environment. Accordingly, looseness between the housing 14 and the mounting member 18 and between the housing 14 and the brush holder 16 can be prevented.

The DC motor 10 according to the embodiment is provided with the fixing structure 100 and the rotor 12 located at the center of the housing 14 with the result that looseness in the motor is minimized in the presence repeated changes in the environment.

Figure 3:
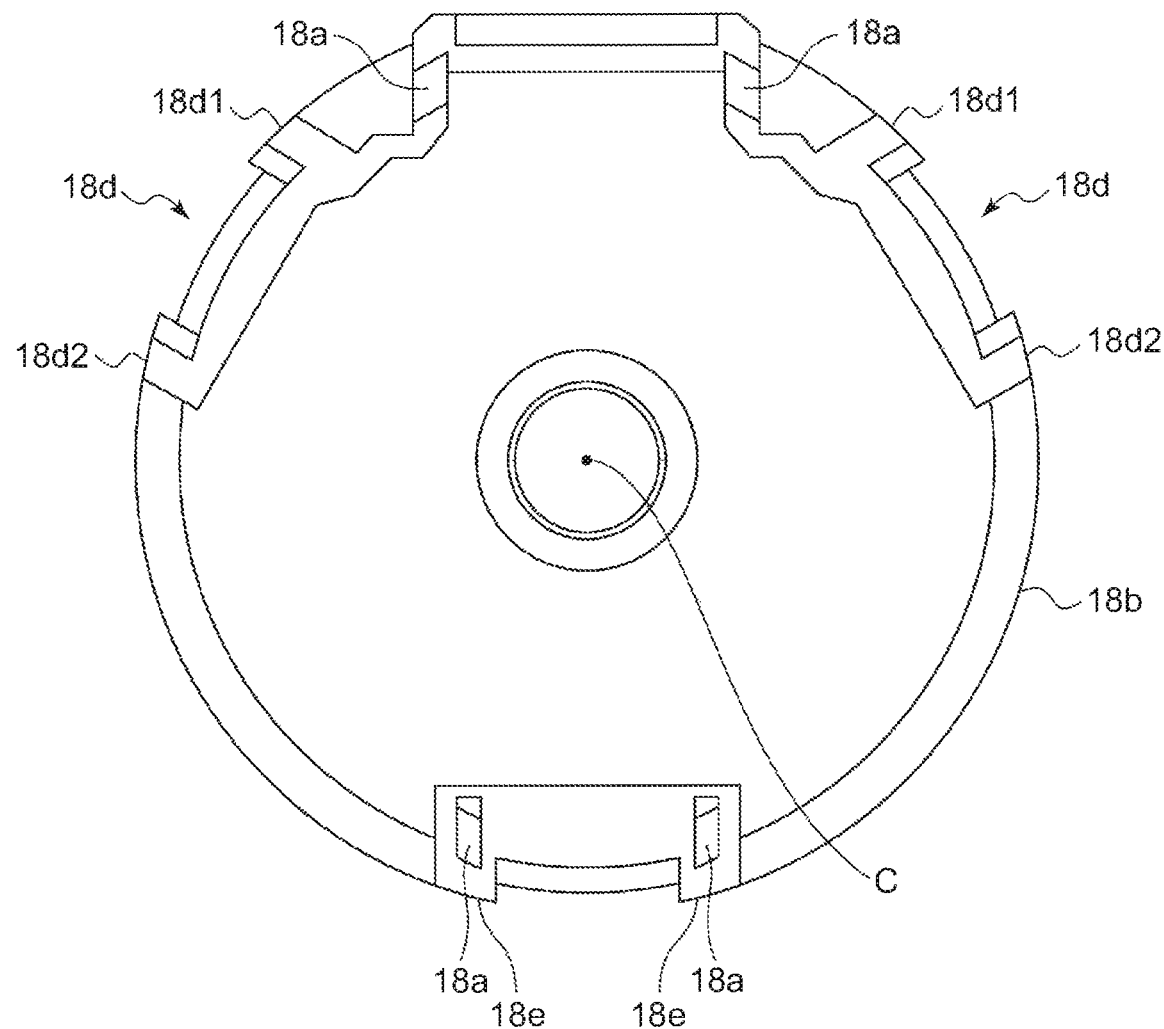
FIG. 3 is a front view of the mounting member according to the embodiment.

A detailed description will now be given, using a more specific structure as an example. FIG. 3 is a front view of the mounting member according to the embodiment.

The pressing part 18a described above is formed in the mounting member 18 at four predetermined positions on the side that faces the brush holder 16. The pressing part 18a includes the second slope 18c formed as a part of the conical slope around a rotational axis C. Further, the first locked part 18d described above is formed at two positions on the outer circumferential surface 18b. The first locked part 18d according to the embodiment includes two convex parts 18d1 and 18d2. Alternatively, there may be only one convex part. A second locked part 18e described below is formed at two positions on the outer circumferential surface 18b of the mounting member 18.

Figure 4:
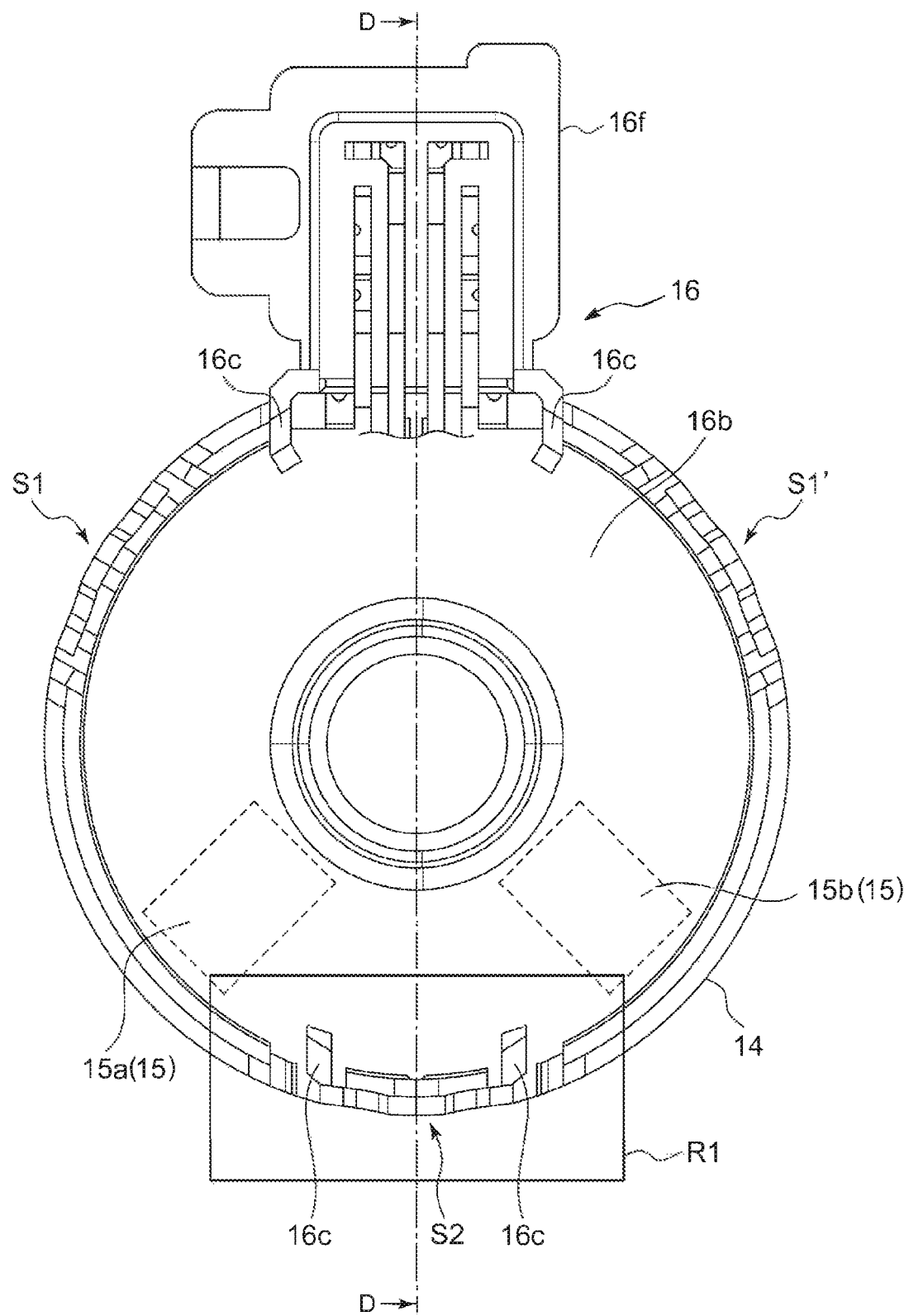
FIG. 4 is a front view showing that the brush holder is mounted to the housing according to the embodiment.

FIG. 4 is a front view showing that the brush holder 16 is mounted to the housing 14 according to the embodiment. At least two brushes 15 are mounted to the brush holder 16. A pair of brushes 15a and 15b are placed at symmetrical positions with respect to line D-D defined when the motor is viewed in the axial direction. The brush 15a is mounted between a first swaging part S1 and a second swaging part S2, and the brush 15b is mounted between a first swaging part S1' and the second swaging part S2. This prevents the brushes 15 from being affected by forces exerted on the first swaging part S1, the first swaging part S1', and the second swaging part S2 and positions the brushes 15 in a stable manner. The brushes 15 may be mounted on the surface of the brush holder 16 that faces the housing 14 or on the surface of the brush holder 16 that faces the mounting member 18. Preferably, the brushes 15 may be mounted on the surface of the brush holder 16 that faces the housing 14 so that the size of the motor in the axial direction is reduced. Detailed of the swaging parts will be described below.

Figure 5:
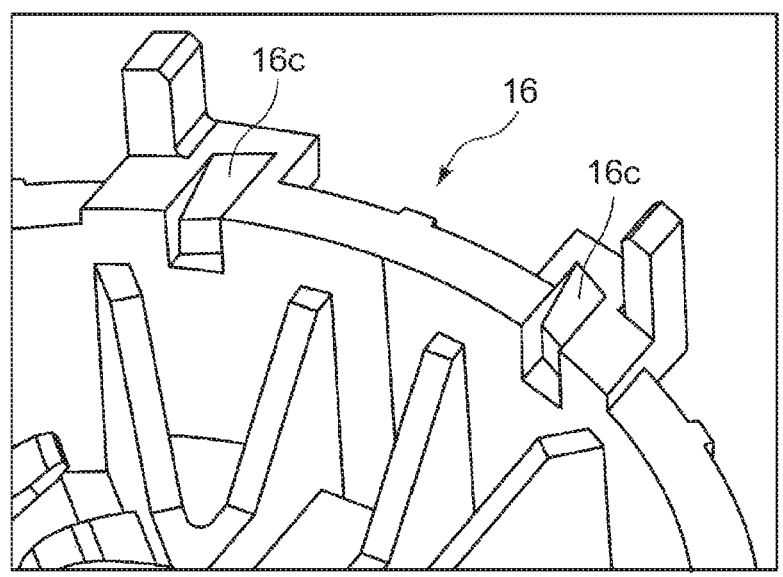
FIG. 5 is a perspective view of an important part of the brush holder in a region R1 shown in FIG. 4.

FIG. 5 is a perspective view of an important part of the brush holder 16 in a region R1 shown in FIG. 4. The pressed part 16c described above is formed in the brush holder 16 at four predetermined positions on the side that faces the mounting member 18. The pressed part 16c includes the first slope 16d formed as a part of the conical slope around the rotational axis C. The pressed part 16c is formed at a position that the pressing part 18a of the mounting member 18 comes into contact with when the brush holder 16 and the mounting member 18 assembled to each other.

By swaging a part of the housing 14 while the mounting member 18 is assembled to the brush holder 16, the four pressing parts 18a press the corresponding pressed parts 16c. The external forces exerted on the respective pressed parts 16c cause the outer circumferential surface 16a of the brush holder 16 to be expanded outward. As a result, the brush holder 16 is firmly fitted to the housing 14. Further, the pressing parts 18a continues to exert a bias to expand the outer circumferential surface 16a of the brush holder 16 outward (see FIG. 2B). For this reason, even if the dimension of the housing 14, the brush holder 16, or the mounting member 18 changes due to a change in the environment, the brush holder 16 can maintain the state of being fitted inside the housing 14 because the first slope 16d of the pressed part 16c and the second slope 18c of the pressing part 18a are displaced such that intimate contact is maintained.

Thus, the fixing structure 100 according to the embodiment can prevent looseness in the direction perpendicular to the axis (X direction or Y direction shown in FIG. 2) caused by a change in the environment between the housing 14 and the brush holder 16. The mounting member 18 receives an axial reactive force from the brush holder 16 so that looseness in the axial direction (Z direction shown in FIG. 2) is also prevented because the axial movement is prevented by the swaging part described below.

Figure 6:
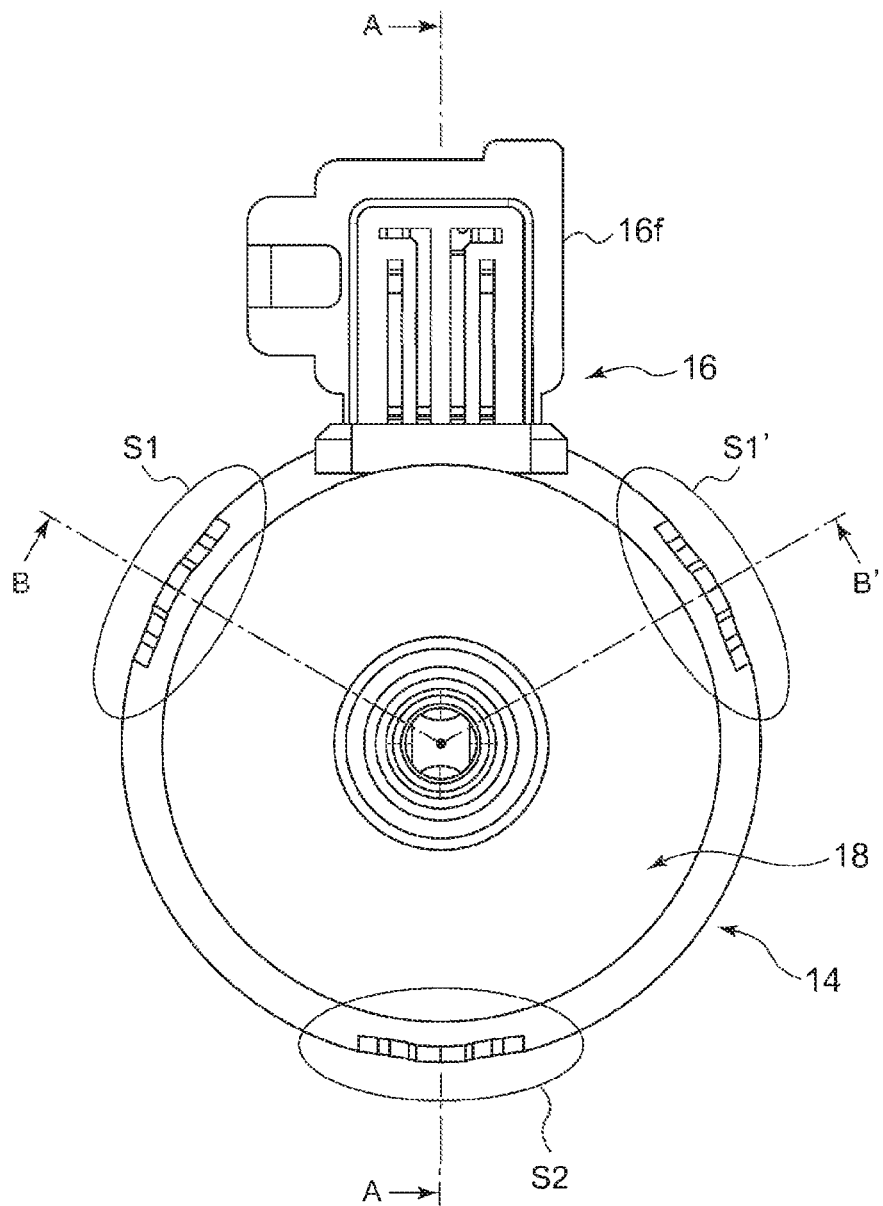
FIG. 6 is a front view of the motor as viewed in the axial direction.
Figure 7:
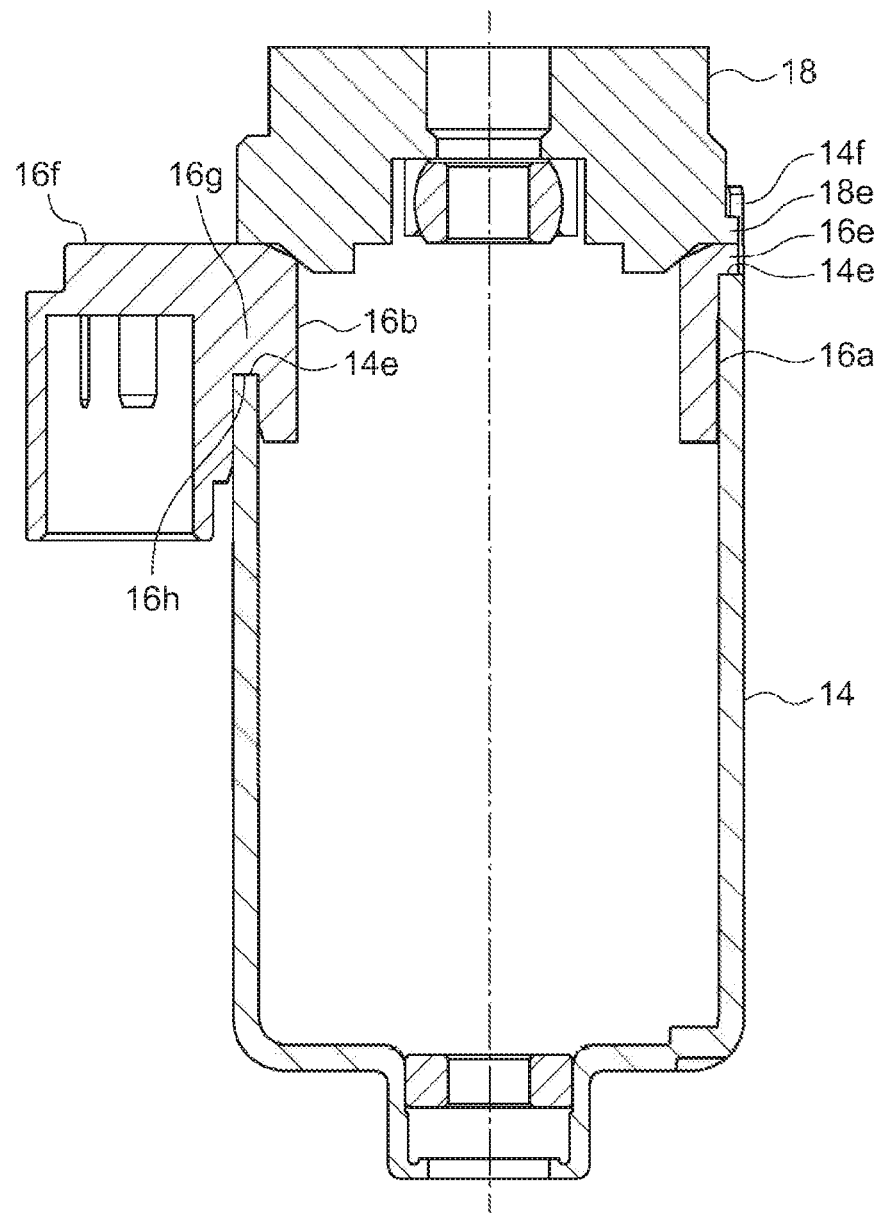
FIG. 7 is a sectional view along A-A of the DC motor shown in FIG. 6.
Figure 8:
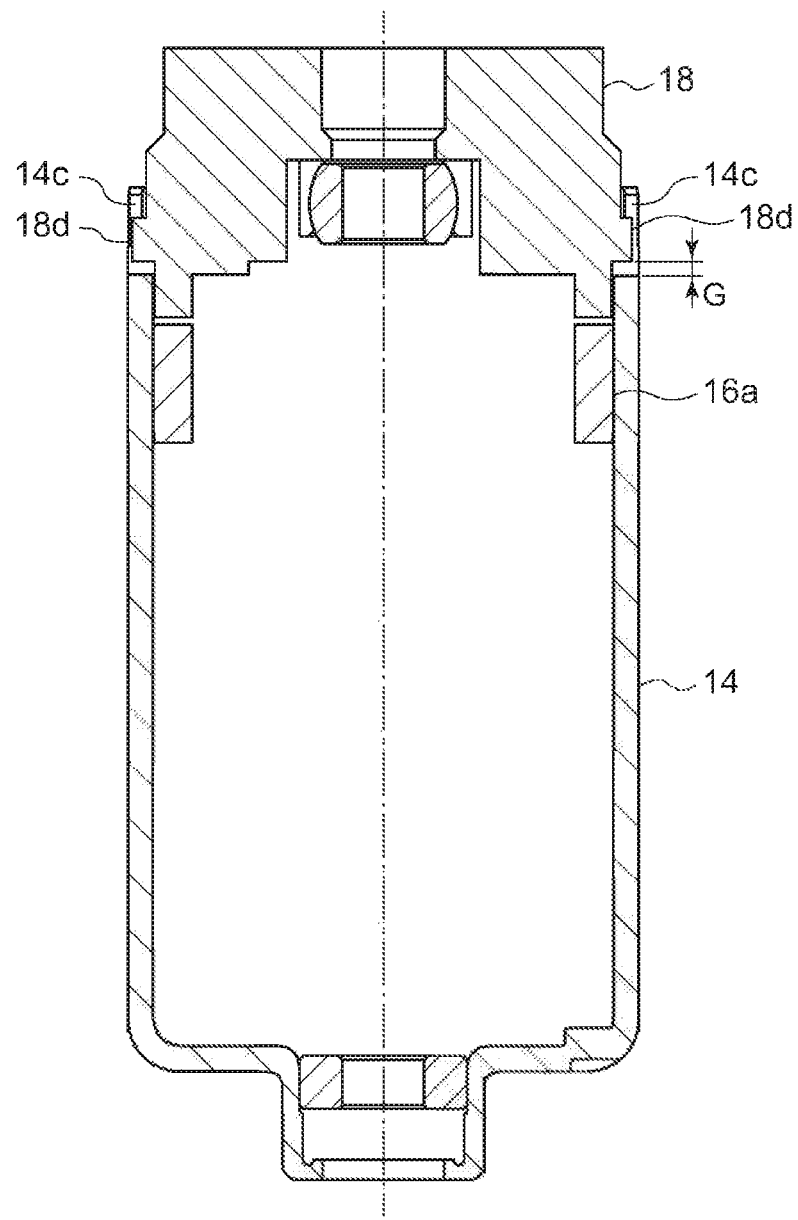
FIG. 8 is a sectional view along B-B' of the DC motor shown in FIG. 6.
Figure 9A:
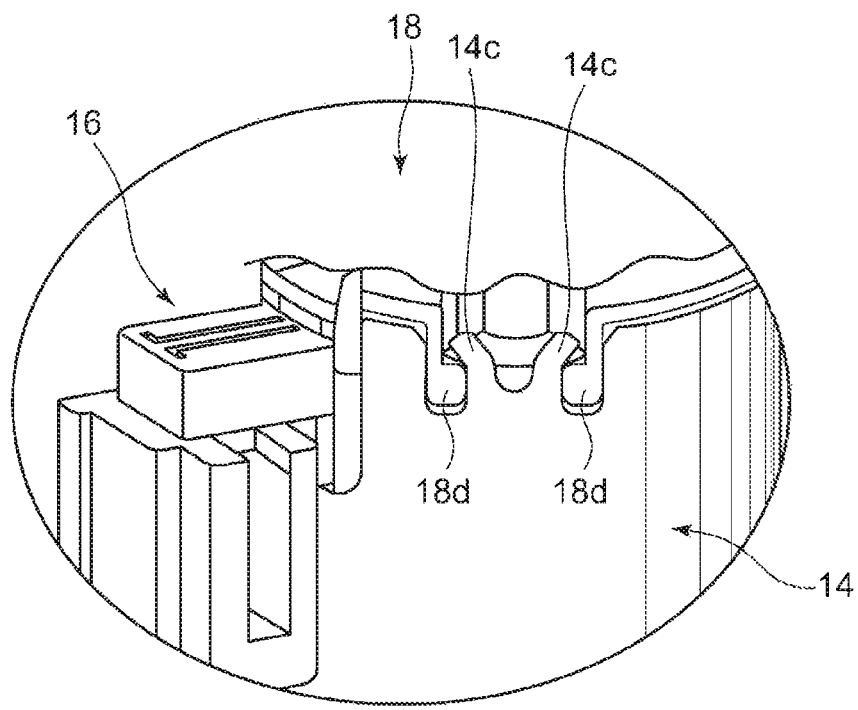
FIG. 9A is a perspective view showing the neighborhood of the first swaging part S1 shown in FIG. 6.
Figure 9B:
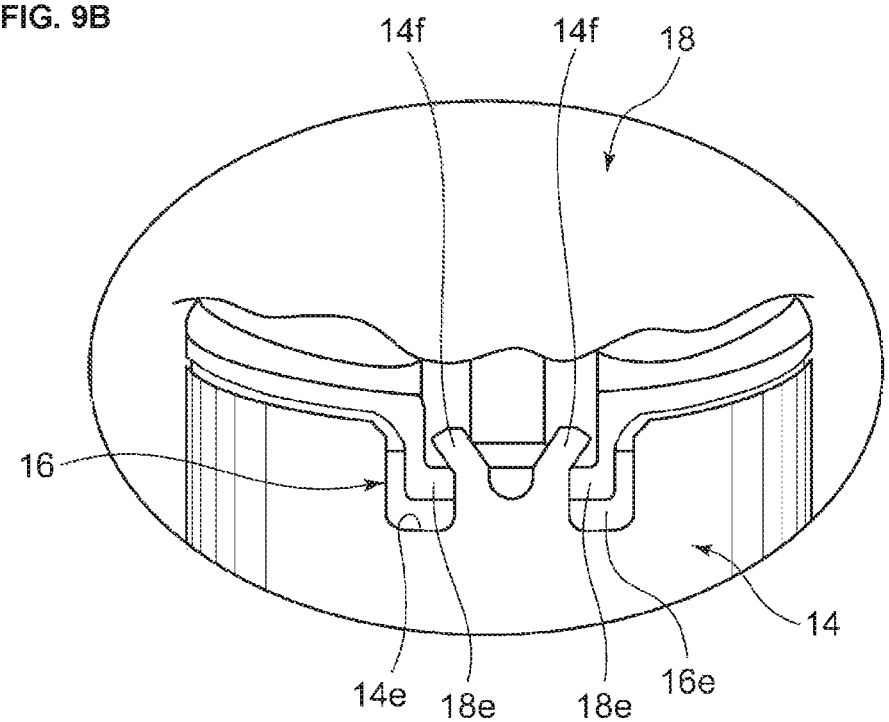
FIG. 9B is a perspective view showing the neighborhood of the second swaging part S2 shown in FIG. 6.
Figure 10:
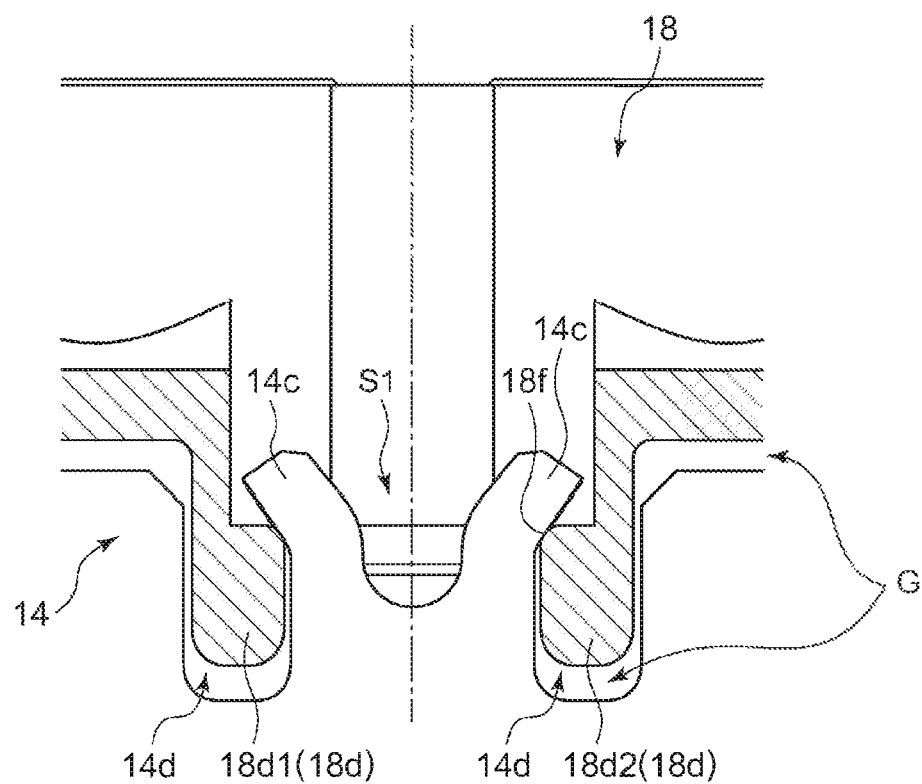
FIG. 10 is a front view of the first swaging part.
Figure 11:
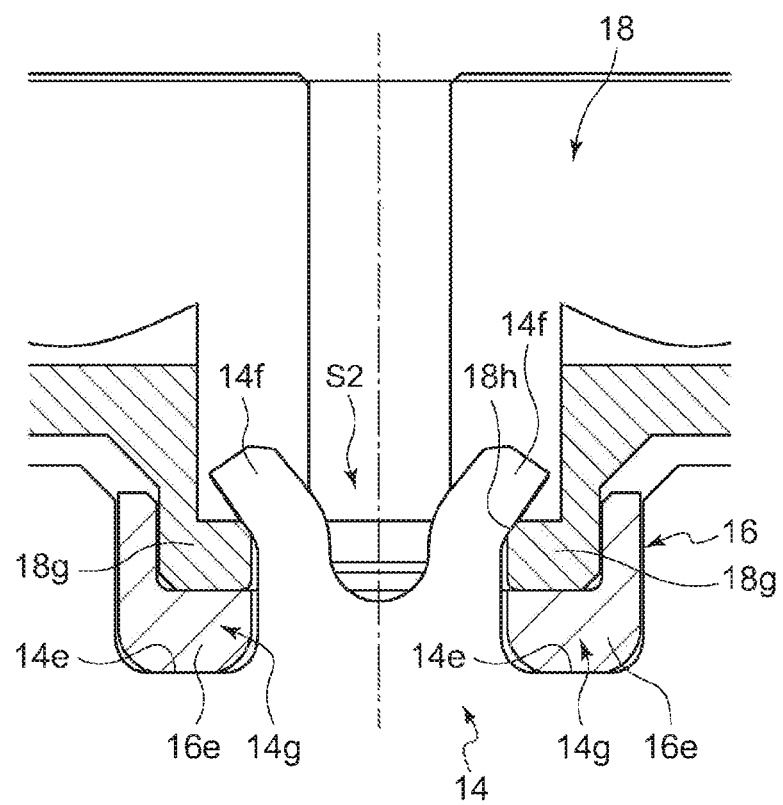
FIG. 11 is a front view of the second swaging part.

FIG. 6 is a front view of the motor as viewed in the axial direction. FIG. 7 is a sectional view along A-A of the DC motor 10 shown in FIG. 6. FIG. 8 is a sectional view along B-B' of the DC motor 10 shown in FIG. 6. FIG. 9A is a perspective view showing the neighborhood of the first swaging part S1 shown in FIG. 6, and FIG. 9B is a perspective view showing the neighborhood of the second swaging part S2 shown in FIG. 6. FIG. 10 is a front view of the first swaging part. FIG. 11 is a front view of the second swaging part.

FIG. 6 shows a state in which the brush holder 16 is mounted to the housing 14, the mounting member 18 is pressed against the brush holder 16, and the brush holder 16 and the mounting member 18 are fixed to the housing 14 by swaging three locations (first swaging parts S1, S1', a second swaging part S2) of the housing 14.

A detailed description will now be given of the first swaging part S1 with reference to FIG. 8, FIG. 9A, and FIG. 10. The first swaging part S1' of the housing 14 is of the same structure as the first swaging part S1 except that the first swaging part S1' is placed at a position symmetrical with the first swaging part S1 across the A-A line shown in FIG. 6.

As shown in FIG. 8, etc., the housing 14 includes, at the end of the housing 14 that faces the mounting member 18, the first locking part 14c that locks the first locked part 18d of the mounting member 18. Further, a notched groove 14d is formed on the end face of the housing 14 so that the first locked part 18d is inserted therein. The first locking part 14c is the first swaging part S1 produced by deforming a part of the housing 14 so that the mounting member 18 is biased toward the housing 14 and is fixed accordingly. The first swaging part S1 according to the embodiment is configured such that a corner part 18f of the first locked part 18d is pressed and locked by expanding a space between the two first locking parts 14c by using a jig, etc. in the circumferential direction. This fixes the mounting member 18 to the housing 14.

The first swaging part S1 is configured such that a gap G is formed between the mounting member 18 and the housing 14 when the mounting member 18 is locked to the housing 14. The gap G allows a part of the mounting member 18 to be deflected even when the dimension of the mounting member 18 is changed due to a change in the temperature or humidity. Accordingly, deformation of the first locking part 14c due to the expansion of the mounting member 18 is prevented. The gap also prevents the first locked part 18d from being deformed as a result of the corner part 18f being pressed hard against the first locking part 14c. As a result, the mounting member 18 is maintained in a state of being biased by the first swaging part S1 toward the housing 14 and fixed accordingly, and the mounting member 18 and the brush holder 16 are prevented from becoming loose.

It is preferable that the gap G is in a range 0.1-0.7 mm. If the gap G is 0.1 mm or larger, the amount of deflection that allows for a change in the dimension of the mounting member 18 is properly secured. If the gap G is 0.7 mm or smaller, foreign materials are unlikely to enter the gap G.

A detailed description will now be given of the second swaging part S2 with reference to FIGS. 7, 9B, and 11.

As shown in FIG. 7, the brush holder 16 includes a first contact part 16e that comes into contact with an end face 14e of the housing 14 when the brush holder 16 is sandwiched between the mounting member 18 and the housing 14. This allows the brush holder 16 to be positioned with precision relative to the housing 14.

The mounting member 18 includes the second locked part 18e that presses the first contact part 16e against the end face 14e. The housing 14 includes, at the end of the housing 14 that faces the mounting member 18, a second locking part 14f that locks the second locked part 18e. A notched groove 14g is formed on the end face 14e of the housing 14 so that the second locked part 18e is inserted therein. The second locking part 14f is the second swaging part S2 produced by deforming a part of the housing 14 so that the first contact part 16e and the second locked part 18e are biased toward the housing 14 and are fixed accordingly. The second swaging part S2 according to the embodiment is configured such that a corner part 18h of the second locked part 18e is pressed and locked by expanding a space between the two second locking parts 14f by using a jig, etc. in the circumferential direction. This fixes the mounting member 18 and the brush holder 16 to the housing 14.

In the second swaging part S2, the second locked part 18e and the first contact part 16e are in intimate contact with each other. Similarly, the first contact part 16e and the end face 14e are in intimate contact with each other. This positions the brush holder 16 and the mounting member 18 relative to the housing 14 so that looseness in the second swaging part S2 is substantially prevented.

As shown in FIG. 7, the brush holder 16 according to the embodiment includes a connector part 16f that projects from the main part 16b in the radial direction and a joint part 16g that joins the main part 16b and the connector part 16f. The joint part 16g includes a second contact part 16h that comes into contact with the end face 14e of the housing 14 when the joint part 16g is sandwiched between the mounting member 18 and the housing 14. The second contact part 16h is provided opposite to the first contact part 16e across the center of the housing 14. This causes the brush holder 16 to come into contact with two remote parts of the end face 14e of the housing 14 so that the precision of positioning is improved and the brush holder 16 is prevented from being mounted at an angle.

Figure 12:
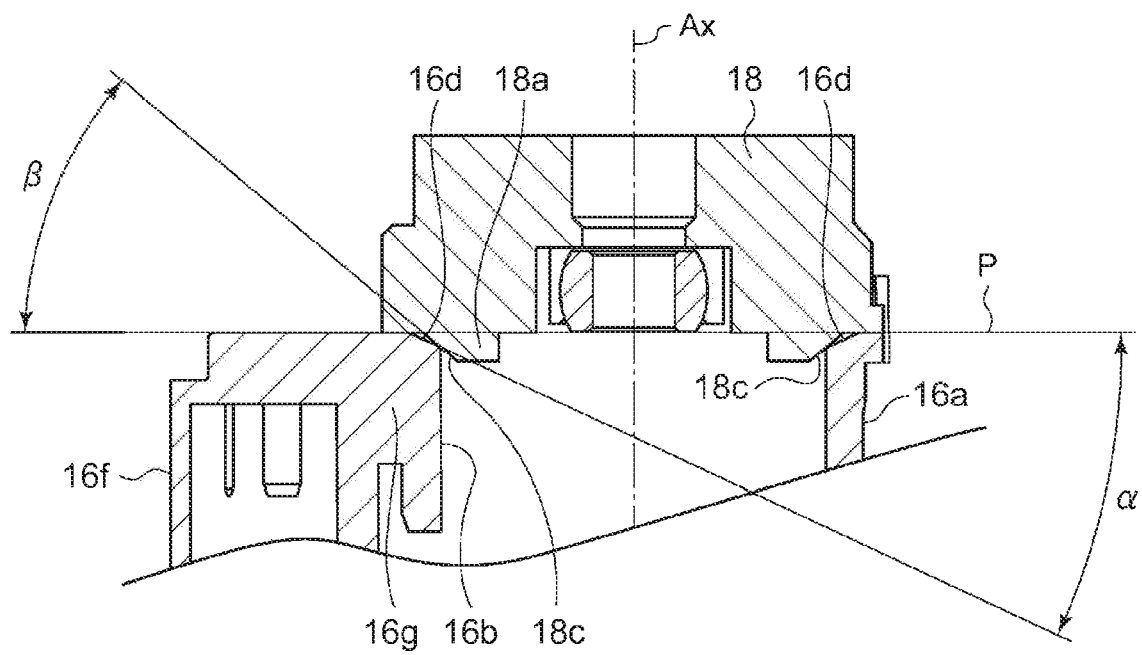
FIG. 12 shows a relationship between the angle of the first slope of the pressed part and the angle of the second slope of the pressing part.

FIG. 12 shows a relationship between the angle of the first slope 16d of the pressed part 16c and the angle of the second slope 18c of the pressing part 18a. As shown in FIG. 12, denoting the angle of the first slope 16d relative to the horizontal plane P perpendicular to the axial direction Ax of the housing 14 by $\alpha°$, and the angle of the second slope 18c relative to the horizontal plane P perpendicular to the axial direction Ax of the housing 14 by $\beta°$, the angles are configured such that $\alpha<\beta$ is met. For example, the angle $\alpha$ is in a range 20°-30°. For example, the angle $\beta$ is in a range 35°-45°. This can expand the outer circumferential surface 16a of the brush holder 16 with a relatively small force to assemble the brush holder 16 and the mounting member 18 together.

The housing 14 according to the embodiment is formed of a metallic material. Meanwhile, the brush holder 16 and the mounting member 18 are formed of a resin material. This can make the first swaging parts S1, S1' and the second swaging part S2 of the housing 14 rigid. Further, this allows the brush holder 16 or the mounting member 18 to be deflected without erecting the first swaging parts S1, S1' or the second swaging part S2 once they are bent, in the event that the brush holder 16 or the mounting member 18 is deformed.

Figure 13:
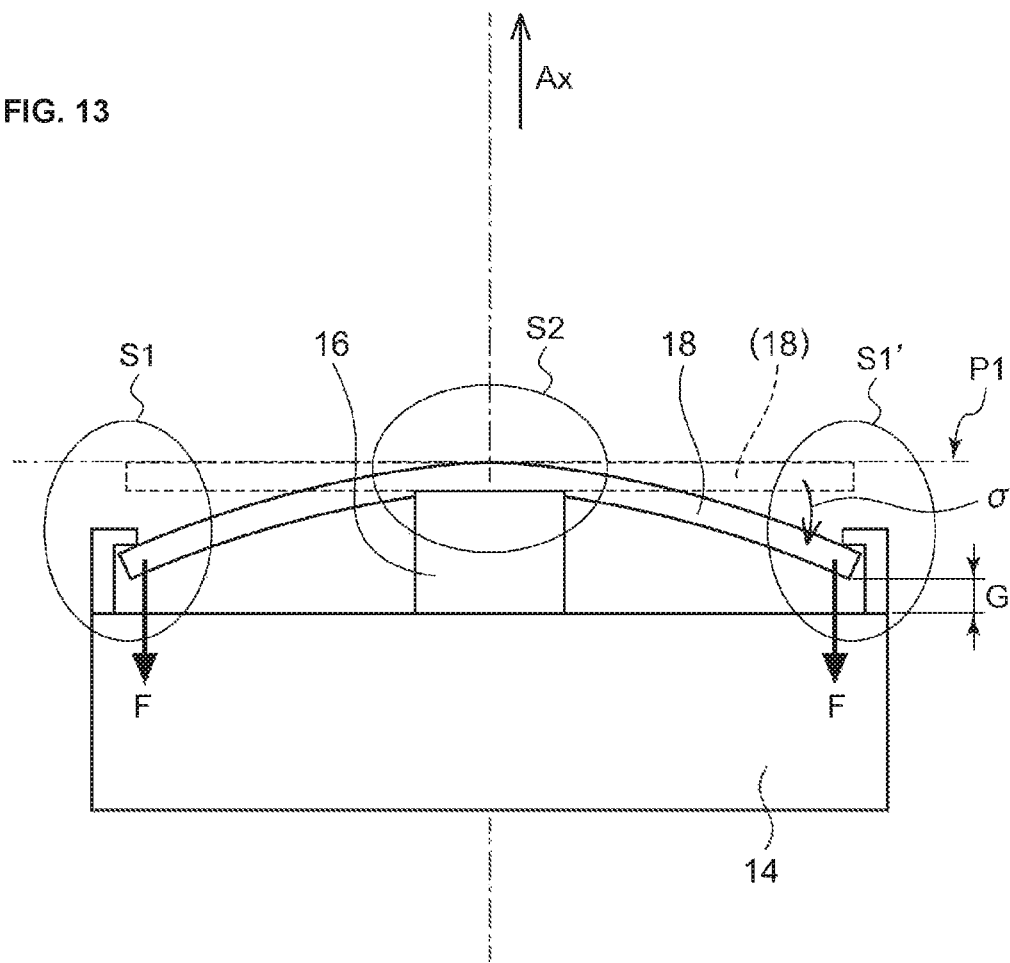
FIG. 13 is a schematic diagram showing forces exerted on the respective parts when the housing, the brush holder and the mounting member are mutually fixed by swaging.

FIG. 13 is a schematic diagram showing forces exerted on the respective parts when the housing 14, the brush holder 16 and the mounting member 18 are fixed to each other by swaging.

As shown in FIG. 13, when the mounting member 18 is deflected from the position aligned with the plane P1 perpendicular to the axial direction Ax (amount of deflection a) and is fixed to the housing 14 by the first swaging parts S1 and S1', a force F in the axial direction Ax will always be exerted on portions of the mounting member 18 fixed by the first swaging parts S1 and S1'. This causes the mounting member 18 to be always pressed against the brush holder 16 in the second swaging part S2, preventing the mounting member 18 and the brush holder 16 from being elevated from the housing 14.

In the first swaging parts S1 and S1', the gap G exists between the brush holder 16 and the housing 14. Portions of the mounting member 18 are maintained in their positions in a manner that the portions can be deformable like a spring. Deformation of the mounting member 18 can be buffered by the gap G so that the swaging parts are prevented from being erected due to the deformation (expansion) of the mounting member 18.

The present invention was described by using the above embodiment, but the embodiment of the present invention is not limited to those described above and appropriate combinations or replacements of the features of the embodiment is also encompassed by the present invention. The embodiments may be modified by way of combinations, rearranging of the processing sequence, design changes, etc., based on the knowledge of a skilled person, and such modifications are also within the scope of the present invention.

What is claimed:

1. A motor comprising:
a cylindrical housing that houses a rotor;
a first member mounted to an opening of the housing; and
a second member sandwiching the first member as mounted between the second member and the housing, wherein
the housing includes, at an end of the housing that faces the second member, a first locking part that locks a first locked part of the second member, and
the second member is elastically deformed by the first locking part and locked to the housing accordingly and is configured such that a gap is formed between the second member and the housing when the second member is locked to the housing.

2. The motor according to claim 1, wherein
the first locking part is a first swaging part produced by deforming a part of the housing.

3. The motor according to claim 2, wherein
the first member includes a first contact part that comes into contact with an end face of the housing when the first member is sandwiched between the second member and the housing.

4. The motor according to claim 3, wherein
the second member includes a second locked part that presses the first contact part toward the end face,
the housing includes, at the end of the housing that faces second member, a second locking part that locks the second locked part, and
the second locking part is a second swaging part produced by deforming a part of the housing so that the first contact part and the second locked part are biased toward the housing and are fixed accordingly.

5. The motor according to claim 4, wherein
the first member includes a main part in which an outer circumferential surface along an inner circumferential surface of the housing is formed, and a pressed part provided to face the second member and configured such that the outer circumferential surface is expanded when the pressed part is pressed, and
the second member includes a pressing part that presses the pressed part when the first member is sandwiched between the second member and the housing.

6. The motor according to claim 5, wherein
the pressed part includes a first slope that grows higher in an axial direction away from a center of the first member toward an outer circumferential surface thereof.

7. The motor according to claim 5, wherein
the pressing part includes a second slope that grows lower in an axial direction away from a center of the second member toward an outer circumferential surface thereof.

8. The motor according to claim 5, wherein
the pressed part includes a first slope that grows higher in an axial direction away from a center of the first member toward an outer circumferential surface thereof, and
the pressing part includes a second slope that grows lower in an axial direction away from a center of the second member toward an outer circumferential surface thereof.

9. The motor according to claim 8, wherein
denoting an angle of the first slope relative to a horizontal plane perpendicular to the axial direction of the housing by $\alpha°$,
denoting an angle of the second slope relative to the horizontal plane perpendicular to the axial direction of the housing by $\beta°$, and
the angles are configured such that $\alpha<\beta$ is met.

10. The motor according to claim 5, wherein
the first member further includes a connector part that projects from the main part in a radial direction and a joint part that joins the main part and the connector part,
the joint part includes a second contact part that comes into contact with the end face of the housing when the joint part is sandwiched between the second member and the housing, and
the second contact part is provided opposite to the first contact part across the center of the housing.

11. The motor according to claim 5, wherein
the first member is a brush holder in which at least two brushes are supported in the main part.

12. The motor according to claim 11, wherein
the housing includes at least two first swaging parts,
one of the two brushes is placed between one of the first swaging parts and the second swaging part, and
the other of the two brushes is placed between the other of the first swaging parts and the second swaging part.

13. The motor according to claim 1, wherein
the gap is in a range 0.1-0.7 mm at least in part.

14. The motor according to claim 1, wherein
the housing is formed of a metallic material, and
the first member and the second member are formed of a resin material.

15. A motor comprising:
a cylindrical housing that houses a rotor;

a first member mounted to an opening of the housing; and a second member sandwiching the first member as mounted between the second member and the housing, wherein the first member includes a main part in which an outer circumferential surface along an inner circumferential surface of the housing is formed, and a pressed part provided to face the second member and configured such that the outer circumferential surface is expanded when the pressed part is pressed, and the second member includes a pressing part that presses the pressed part when the second member sandwiches the first member between the second member and the housing.

* * * * *